(12) United States Patent
Nakayama

(10) Patent No.: US 11,633,866 B2
(45) Date of Patent: Apr. 25, 2023

(54) ROBOT CASING AND ROBOT

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 56 days.

(21) Appl. No.: 17/061,935

(22) Filed: Oct. 2, 2020

(65) Prior Publication Data

US 2021/0146555 A1 May 20, 2021

(30) Foreign Application Priority Data

Nov. 20, 2019 (JP) .............................. JP2019-209588

(51) Int. Cl.
| | |
|---|---|
| *B25J 17/00* | (2006.01) |
| *B25J 9/00* | (2006.01) |
| *B25J 19/00* | (2006.01) |
| *B25J 18/00* | (2006.01) |

(52) U.S. Cl.
CPC ............ *B25J 17/00* (2013.01); *B25J 9/0012* (2013.01); *B25J 18/00* (2013.01); *B25J 19/007* (2013.01)

(58) Field of Classification Search
CPC ...... B25J 19/007; B25J 9/0012; B25J 17/025; B25J 9/0009
See application file for complete search history.

(56) References Cited

U.S. PATENT DOCUMENTS

| | | | | |
|---|---|---|---|---|
| 8,544,360 | B2 * | 10/2013 | Liu .................... | B25J 19/0029 901/27 |
| 2011/0154933 | A1 * | 6/2011 | Liu .................... | B25J 19/0029 74/490.02 |
| 2014/0137686 | A1 * | 5/2014 | Nogami .................. | B25J 18/00 901/23 |
| 2014/0137691 | A1 * | 5/2014 | Nogami .................. | B25J 9/102 901/29 |
| 2015/0290816 | A1 * | 10/2015 | Ubidia ................ | F04C 18/3441 414/737 |
| 2018/0169760 | A1 | 6/2018 | Negishi | |
| 2018/0290293 | A1 | 10/2018 | Nakayama et al. | |

(Continued)

FOREIGN PATENT DOCUMENTS

| | | |
|---|---|---|
| JP | 2013-018058 A | 1/2013 |
| JP | 2018-100445 A | 6/2018 |

(Continued)

*Primary Examiner* — Jake Cook
(74) *Attorney, Agent, or Firm* — Maier & Maier, PLLC

(57) ABSTRACT

A robot casing includes, in a hollow resin body portion, two attachment openings and one work opening that communicate between an inside and an outside of the body portion. The two attachment openings are respectively provided in both end portions of the body portion; a metal member constituting an attachment surface is embedded in a resin constituting the body portion at a periphery of the attachment opening; the metal member is provided with attachment holes that allow attachment screws, which are used for attachment to the attachment surface, to penetrate therethrough or to be fastened thereinto, and is also embedded in the resin in a state in which the attachment surface is exposed; and components can be respectively attached to the two attachment openings by utilizing the work opening.

19 Claims, 17 Drawing Sheets

(56) References Cited

U.S. PATENT DOCUMENTS

| | | |
|---|---|---|
| 2020/0030964 A1 | 1/2020 | Nakayama et al. |
| 2020/0171720 A1 | 6/2020 | Nakayama |
| 2020/0406448 A1* | 12/2020 | Luo ..................... B25J 19/0075 |
| 2021/0337693 A1* | 10/2021 | Kim ....................... B25J 9/0009 |

FOREIGN PATENT DOCUMENTS

| | | |
|---|---|---|
| JP | 2018-176337 A | 11/2018 |
| JP | 6470342 B2 | 2/2019 |
| JP | 2020-015127 A | 1/2020 |
| JP | 2020-082311 A | 6/2020 |

* cited by examiner

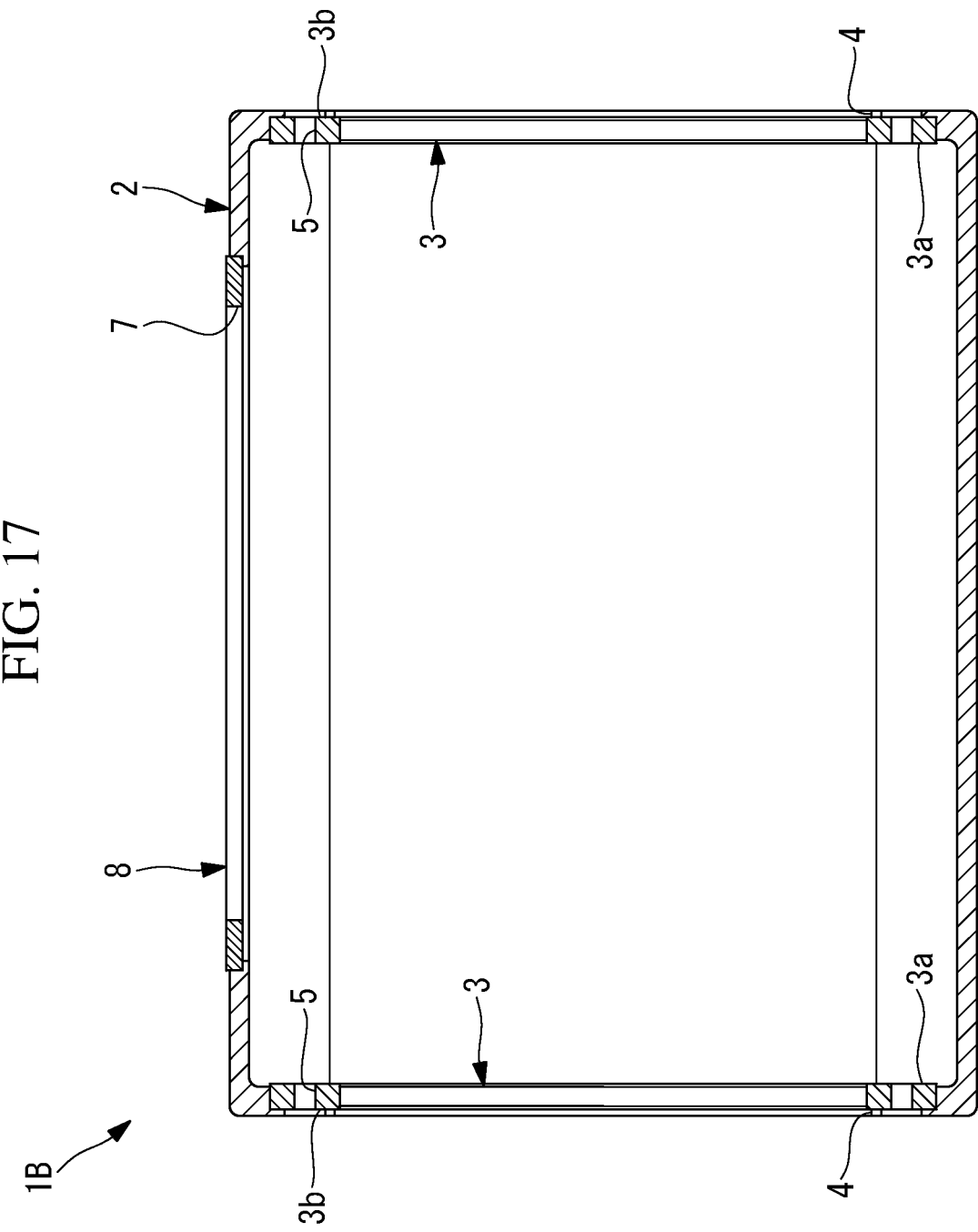

ROBOT CASING AND ROBOT

CROSS-REFERENCE TO RELATED APPLICATIONS

This application is based on Japanese Patent Application No. 2019-209588, the content of which is incorporated herein by reference.

FIELD

The present invention relates to a robot casing and a robot.

BACKGROUND

In general, components of an industrial robot are composed of metals, such as aluminum alloys, to ensure sufficient strength while achieving a weight reduction (for example, see Japanese Unexamined Patent Application, Publication No. 2013-018058).

SUMMARY

An aspect of the present invention is directed to a robot casing including, in a hollow resin body portion, two attachment openings and one work opening that communicate between an inside and an outside of the body portion, wherein: the two attachment openings are respectively provided in both end portions of the body portion; a metal member constituting an attachment surface is embedded in a resin constituting the body portion at a periphery of the attachment opening; the metal member is provided with attachment holes that allow attachment screws, which are used for attachment to the attachment surface, to penetrate therethrough or to be fastened thereinto, and is also embedded in the resin in a state in which the attachment surface is exposed; and components can be respectively attached to the two attachment openings by utilizing the work opening.

BRIEF DESCRIPTION OF DRAWINGS

FIG. 17 is a longitudinal sectional view of the second robot casing in FIG. 16.

DETAILED DESCRIPTION OF EMBODIMENT

A robot casing (hereinafter simply referred to as "casing") 1A, 1B, 1C, 1D and a robot 100 according to an embodiment of the present invention will be described below with reference to the drawings.

Figure 1:
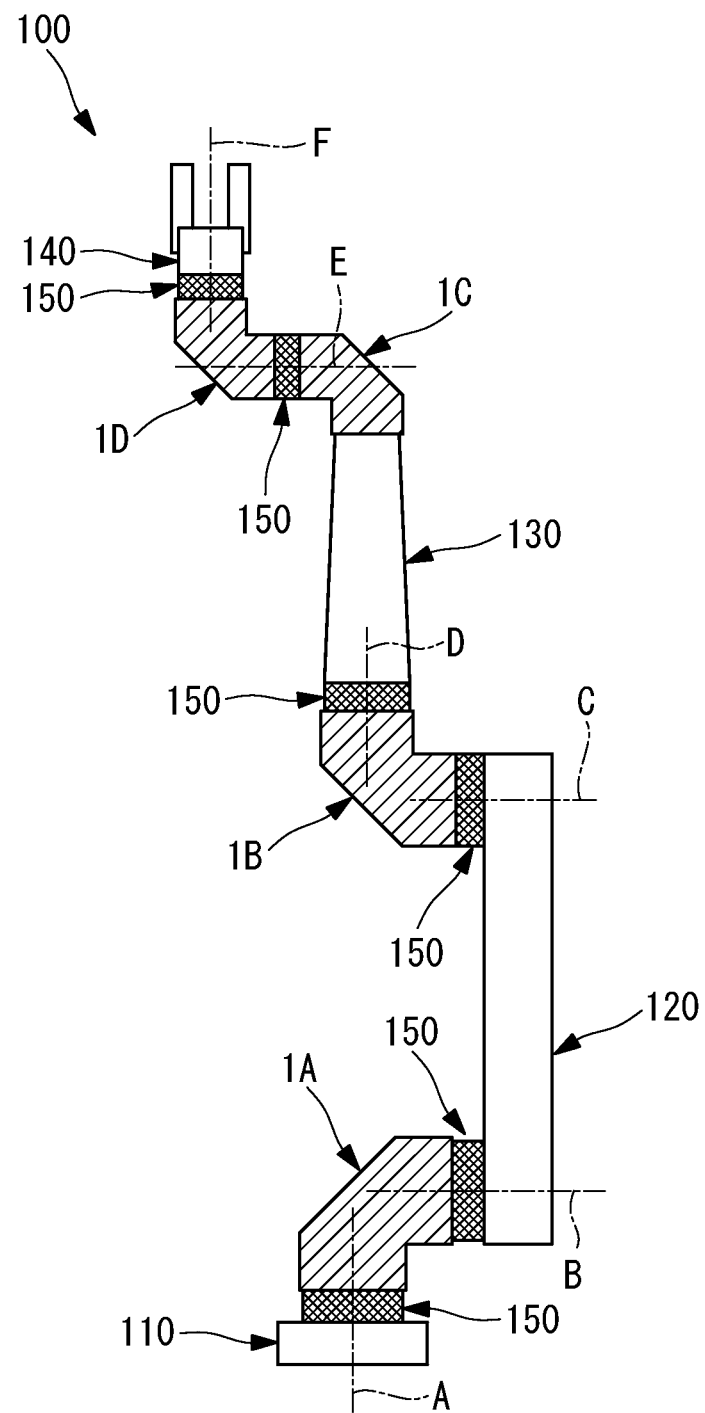
FIG. 1 is a schematic diagram showing an example of a robot to which a robot casing according to an embodiment of the present invention is applied.

As shown in FIG. 1, at least one casing 1A, 1B, 1C, 1D according to this embodiment is provided in the robot 100. In an example of the robot 100 shown in FIG. 1, the four casings 1A, 1B, 1C, 1D are used.

The first casing 1A is supported so as to be rotatable about a vertical first axis A with respect to a base 110 installed on a floor, and also supports a first arm 120 so as to be rotatable about a horizontal second axis B.

The second casing 1B is supported, at the distal end of the first arm 120, so as to be rotatable about a third axis C parallel to the second axis B, and also supports a tubular second arm 130 so as to be rotatable about a fourth axis D along the longitudinal direction thereof.

The third casing 1C is fixed at the distal end of the second arm 130, and also supports the fourth casing 1D so as to be rotatable about a fifth axis E orthogonal to the fourth axis D. Furthermore, the fourth casing 1D is supported so as to be rotatable about the fifth axis E with respect to the third casing 1C, and also supports an attachment flange 140 to which an end effector is to be attached, so as to be rotatable about a sixth axis F orthogonal to the fifth axis E.

The first, second, and fourth casings 1A, 1B, 1D each have actuators 150 directly fixed at both ends, and the third casing 1C has an actuator 150 directly fixed at one end and an actuator 150 indirectly fixed at the other end via the second arm 130. The actuators 150 each include a reduction gear 151 and a motor 152, which will be described later. The first to fourth casings 1A, 1B, 1C, 1D have different sizes but substantially the same shape.

Figure 2:
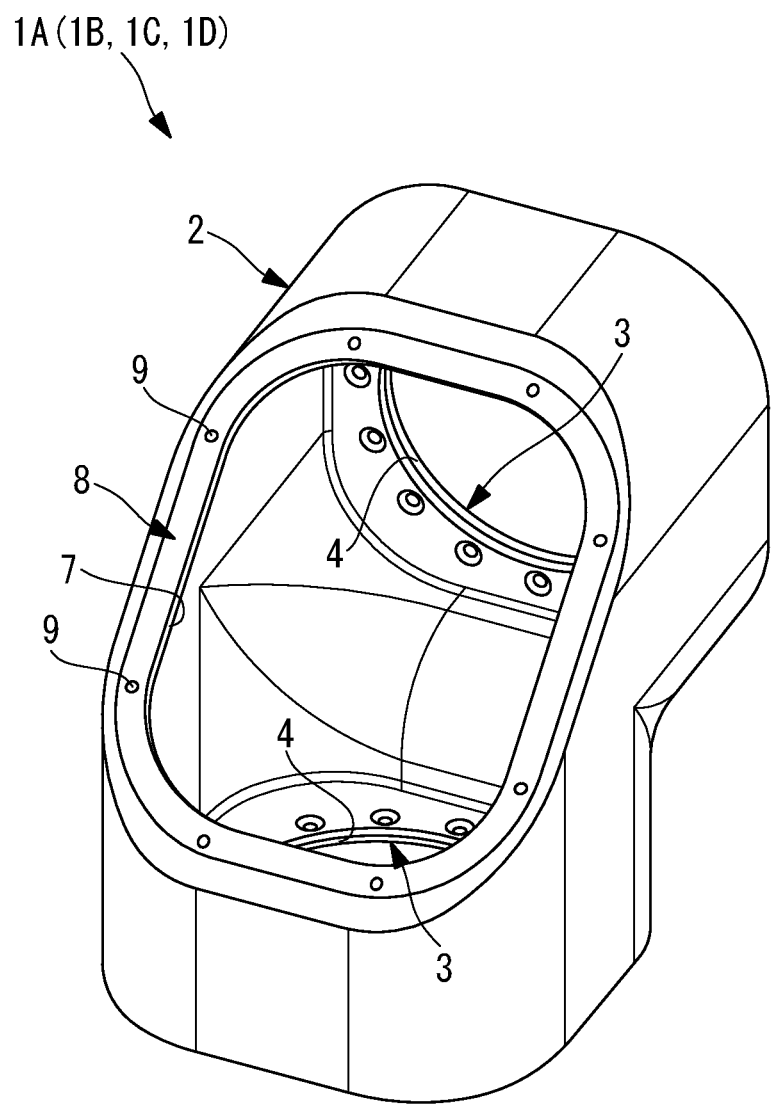
FIG. 2 is a perspective view showing the robot casing in FIG. 1.
Figure 3:
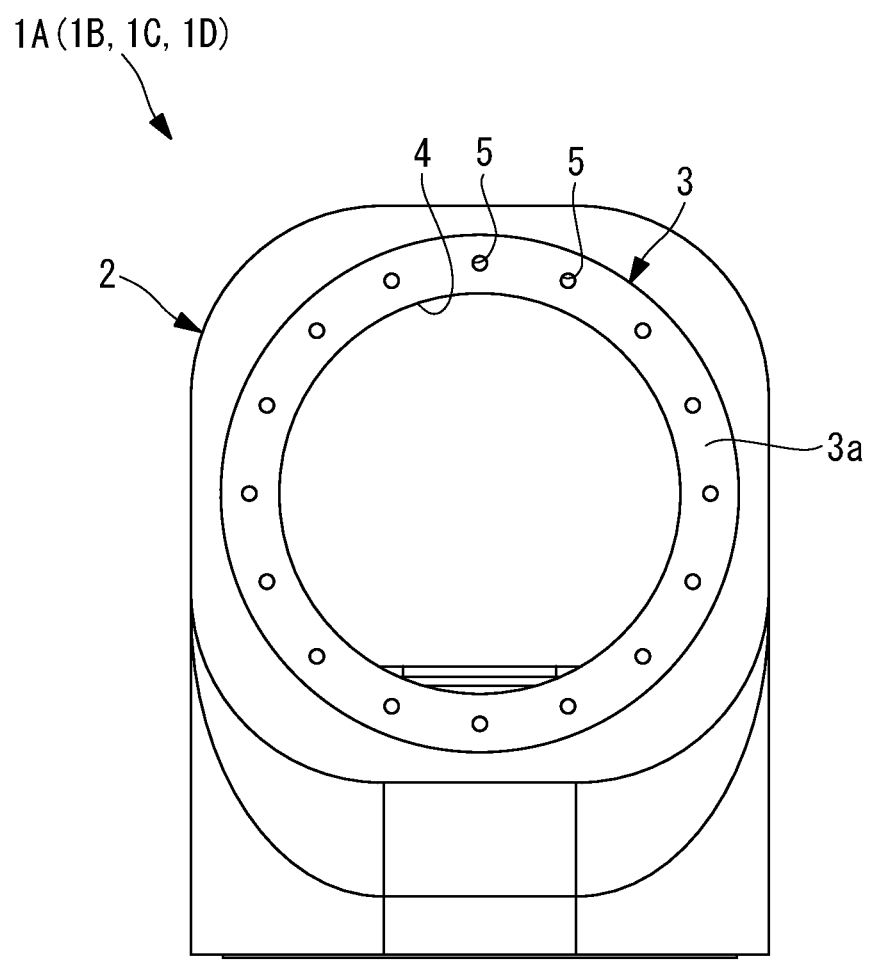
FIG. 3 is a front view of the robot casing in FIG. 2.
Figure 4:
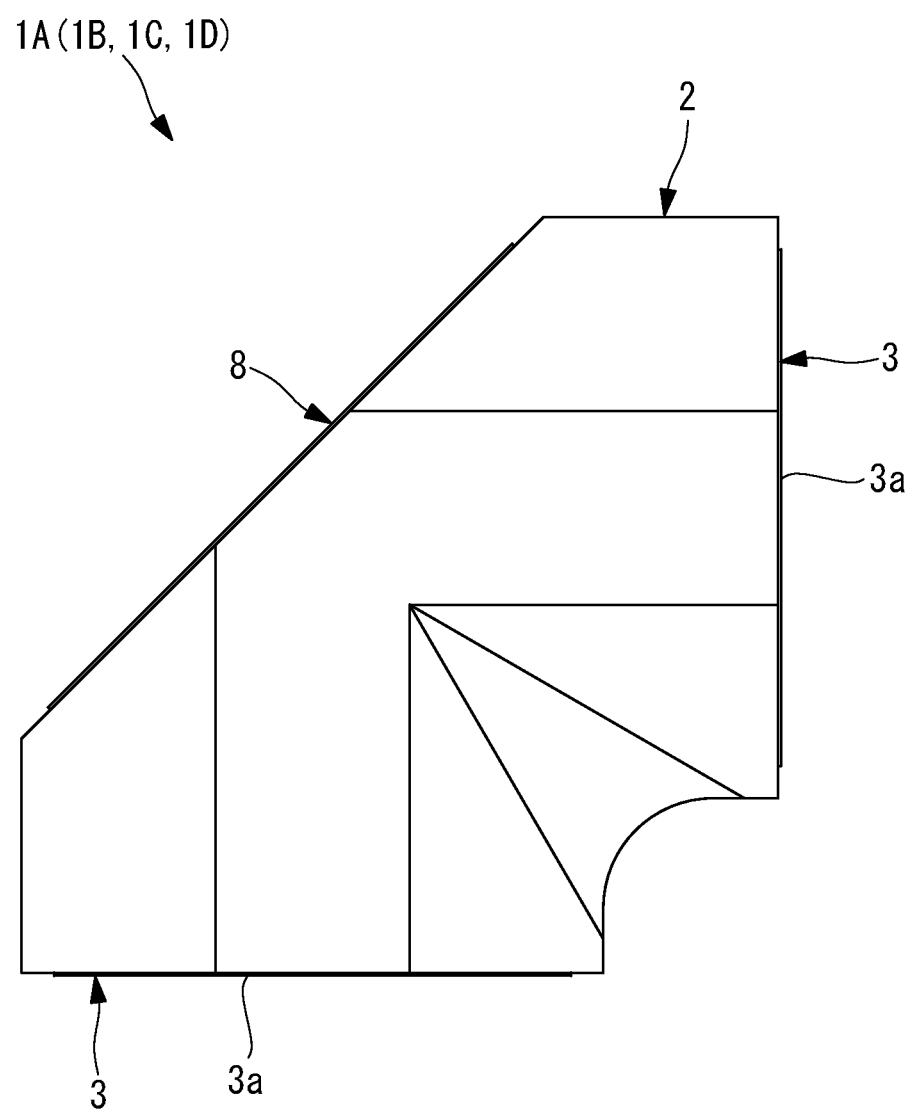
FIG. 4 is a side view of the robot casing in FIG. 2.

As shown in FIGS. 2 and 3, the casing 1A, 1B, 1C, 1D according to this embodiment includes a tubular resin body portion 2, the outer shape of which has a square cross-sectional shape with rounded corners. As shown in FIG. 4, the body portion 2 is curved at a right angle at a central position in the length direction and is formed in a hollow square tubular shape curved in an L-shape as a whole.

The body portion 2 is provided with, at both ends thereof in the length direction, flat metal plates (metal members) 3 that are embedded in a resin constituting the body portion 2 by means of, for example, insert molding.

Figure 5:
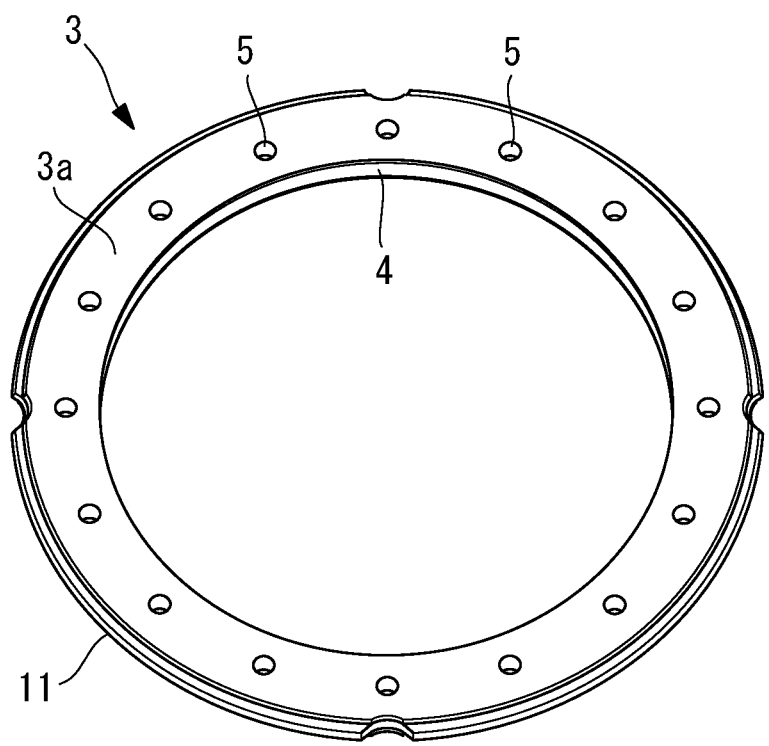
FIG. 5 is a perspective view showing a metal plate provided at an attachment opening of the robot casing in FIG. 2.

As shown in FIG. 5, the metal plate 3 is formed in an annular shape having a circular central hole 4. A plurality of through-holes 5 penetrating in the plate thickness direction are provided in the metal plate 3 at intervals in the circumferential direction.

Figure 6:
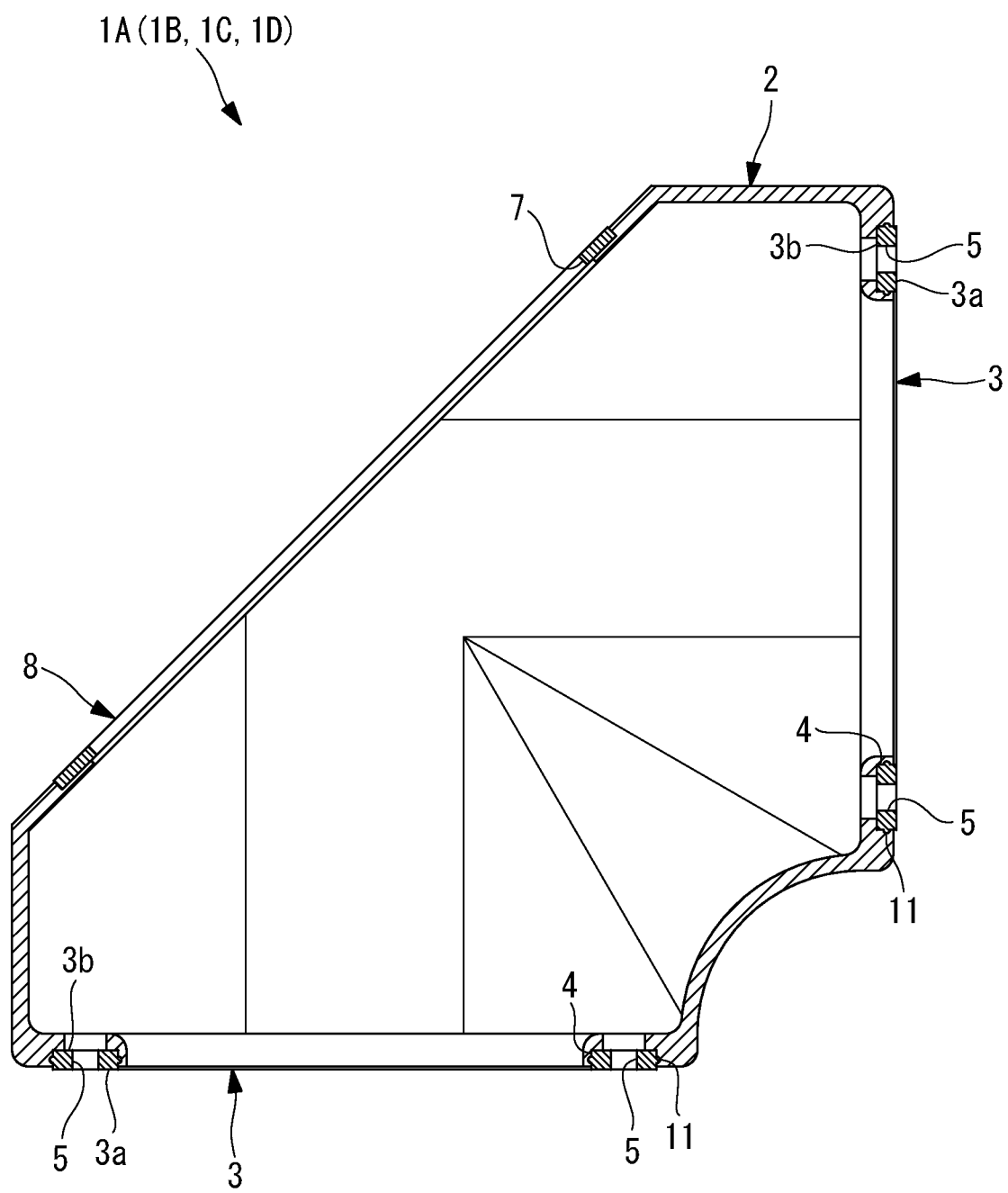
FIG. 6 is a longitudinal sectional view of the robot casing in FIG. 2.

As shown in FIG. 6, the two metal plates 3 at both ends of the body portion 2 are arranged in a mutually orthogonal positional relationship. The central holes 4 of the two metal plates 3 constitute two attachment openings that open an internal space of the hollow body portion 2 to the outside.

Figure 7:
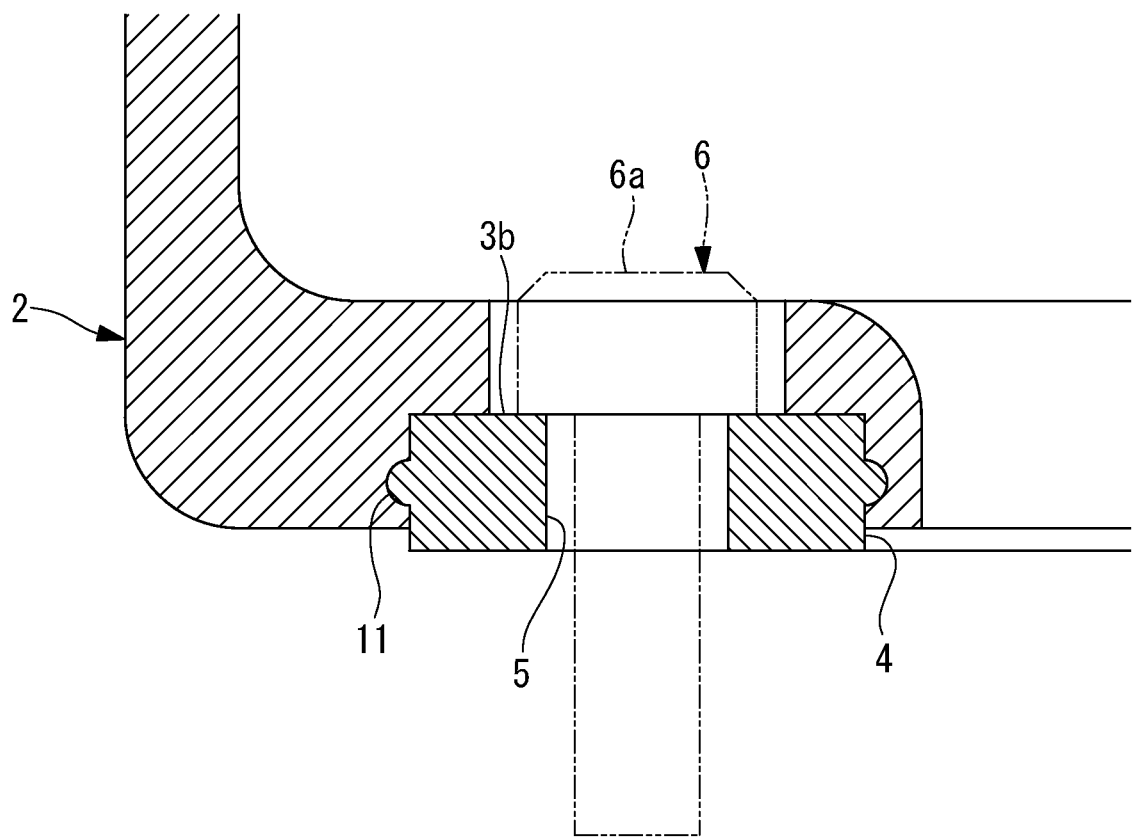
FIG. 7 is a partial longitudinal sectional view of the attachment opening of the robot casing in FIG. 2.

As shown in FIGS. 6 and 7, one surface of the metal plate in the plate thickness direction serves as an attachment surface 3a, and the entire attachment surface 3a is exposed. In an example shown in FIG. 6, the attachment surface 3a is disposed on an outer side of the casing 1A, 1B, 1C, 1D.

In addition, as shown in FIG. 7, the other surface 3b of the metal plate 3 in the plate thickness direction is covered with the resin constituting the body portion 2, in a state in which the peripheries of the through-holes 5 are partially exposed. A portion of the surface 3b of the metal plate 3, which is exposed at the periphery of the through-hole 5, is exposed in an area slightly larger than an outer diameter of a head portion 6a of an attachment screw 6 to be inserted into the through-hole 5, so that the surface 3b functions as a seating surface of the attachment screw 6, as indicated by a chain line in FIG. 7.

In addition, the attachment surface 3a of the metal plate is disposed at a position protruded from the resin constituting the body portion 2.

As shown in FIGS. 2 and 6, the body portion 2 is provided with one rectangular work opening 7 in a central curved portion in the length direction.

The work opening 7 is also configured by a central hole in an annular metal plate (another metal member) 8 by embedding the metal plate 8 into the resin constituting the body portion 2, and opens the internal space of the body portion 2 to the outside. A plurality of screw holes (attachment holes) 9 are provided in the metal plate 8 at intervals in the circumferential direction.

The "work" in the work opening 7 indicates: attaching the reduction gear 151 and the motor 152, which are mechanism components, to the metal plate 3; detaching the reduction gear 151 and the motor 152 from the metal plate 3; replacing the motor 152; attaching/detaching, to/from the motor 152, a connector of a wire body for driving the motor 152; replacing the wire body itself; and so forth.

The work opening 7 is configured so as to be slightly larger than the attachment openings 4, and is disposed on a wall surface of the body portion 2 between the two attachment openings 4 such that the work opening 7 respectively forms 45° angles with respect to the two metal plates 3 constituting the attachment openings 4. With this configuration, the work opening 7 is formed at a position and has a size such that components can be made to pass therethrough, said components being respectively attached, directly or indirectly, to the two attachment openings 4 through the interior of the body portion 2 from the outside of the work opening 7. Here, the components to be directly or indirectly attached are, for example, the reduction gears 151 and the motors 152 as shown in FIG. 8.

Figure 8:
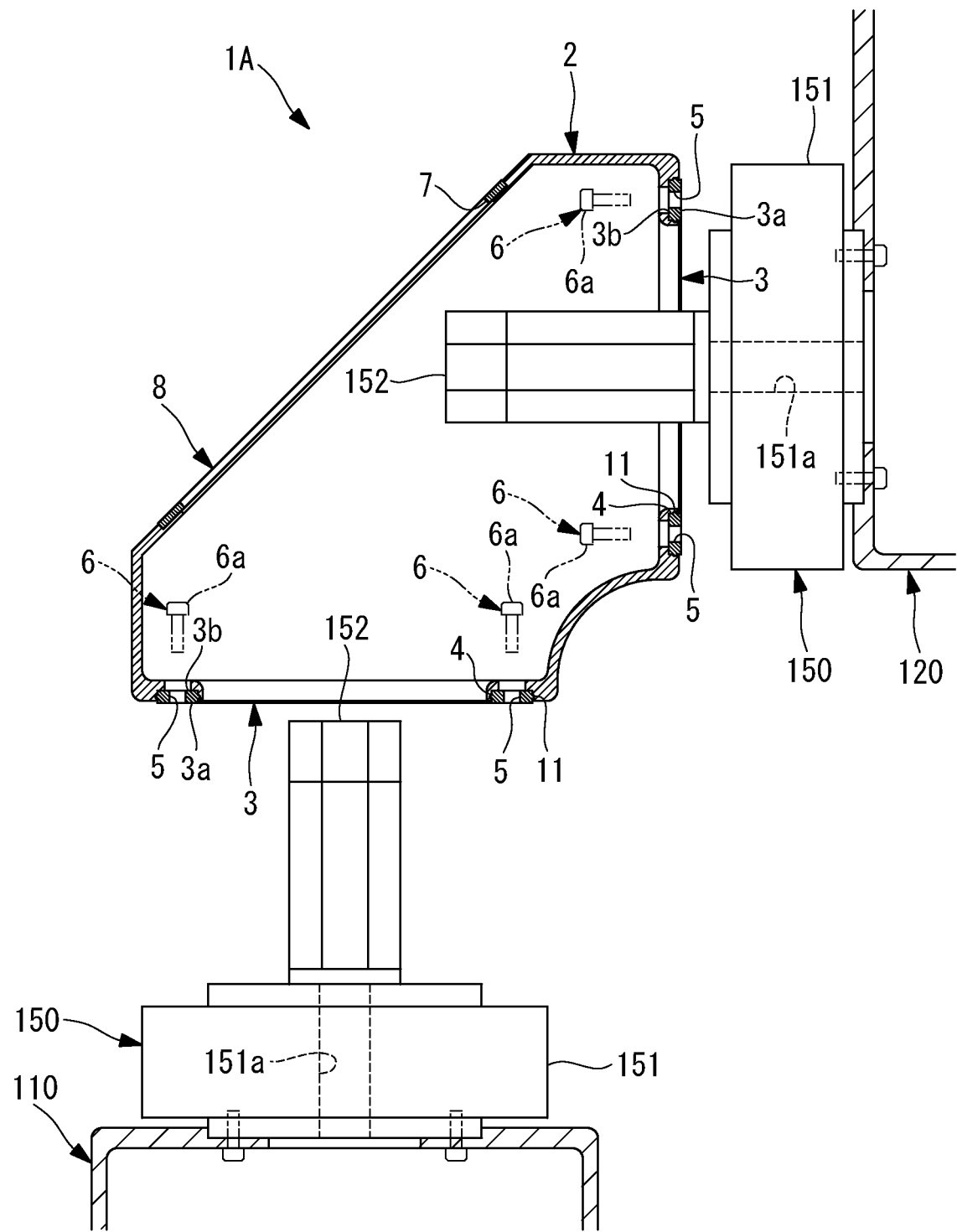
FIG. 8 is an exploded longitudinal sectional view for explaining work for connecting the robot casing in FIG. 2 to a first-axis reduction gear and a second-axis reduction gear.

In the case of FIG. 8, it is necessary to determine the size and the position of the work opening 7 so that the motors 152 can pass through the work opening 7 even when maintenance work, such as motor replacement, is performed. In the case in which the reduction gears 151 themselves need to be accommodated in the body portion 2 so as not to be exposed, it is necessary to form the work opening 7 so as to have a size that allows the reduction gears 151 to pass therethrough. However, as the size of the work opening 7 is increased, it becomes difficult to ensure sufficient strength of the body portion 2. Therefore, it is preferable to have a single work opening 7 through which the two metal plates 3 can both be accessed. In addition, if a sufficient size is ensured such that not only the reduction gears 151 and the motors 152 but also attachment bolts, a long T-wrench, or a hand of a worker can pass through the work opening 7, it is also possible to ensure sufficient workability.

The work opening 7 is closed by a lid body 10, which will be described later, in a normal state when not used.

In addition, an opening having a size that does not affect ensuring sufficient strength of the body portion 2 may be provided separately from the work opening 7. It suffices that this opening have such a size that, for example, attachment bolts, an L-wrench or a T-wrench, which is a fastening tool for the attachment bolts, or a hand of a worker can pass therethrough. As a lid for the opening, for example, a resin lid provided with a snap-fit structure or an elastic body utilizing elastic deformation, such as a rubber, may be employed.

In addition, the casing 1A, 1B, 1C, 1D according to this embodiment is provided with the lid body 10 capable of closing the work opening 7. A plurality of through-holes penetrating in the plate thickness direction are provided in the lid body 10 at intervals in the circumferential direction. The work opening 7 can be closed by making screws penetrate through the through-holes of the lid body 10 and fastening the screws into the screw holes 9 of the metal plate 8.

The operation of the thus-configured casing 1A, 1B, 1C, 1D and robot 100 according to this embodiment will be described below.

To configure the robot 100 by using the casing 1A, 1B, 1C, 1D according to this embodiment, as shown in FIG. 8, for example, an input shaft of the reduction gear 151 having an output shaft fixed to the base 110 is brought into close contact with the attachment surface 3a of the metal plate 3 having one attachment opening 4. Then, the attachment screws 6 that are made to pass through the through-holes 5 of the metal plate 3 from the interior of the body portion 2 through the work opening 7 are fastened into screw holes of the reduction gear 151.

In addition, an input shaft of the reduction gear 151 having an output shaft fixed to the first arm 120 is brought into close contact with the attachment surface 3a of the metal plate 3 having the other attachment opening 4. Then, the attachment screws 6 that are made to pass through the through-holes 5 of the metal plate 3 from the interior of the body portion 2 through the work opening 7 are fastened into screw holes of the reduction gear 151.

Figure 9:
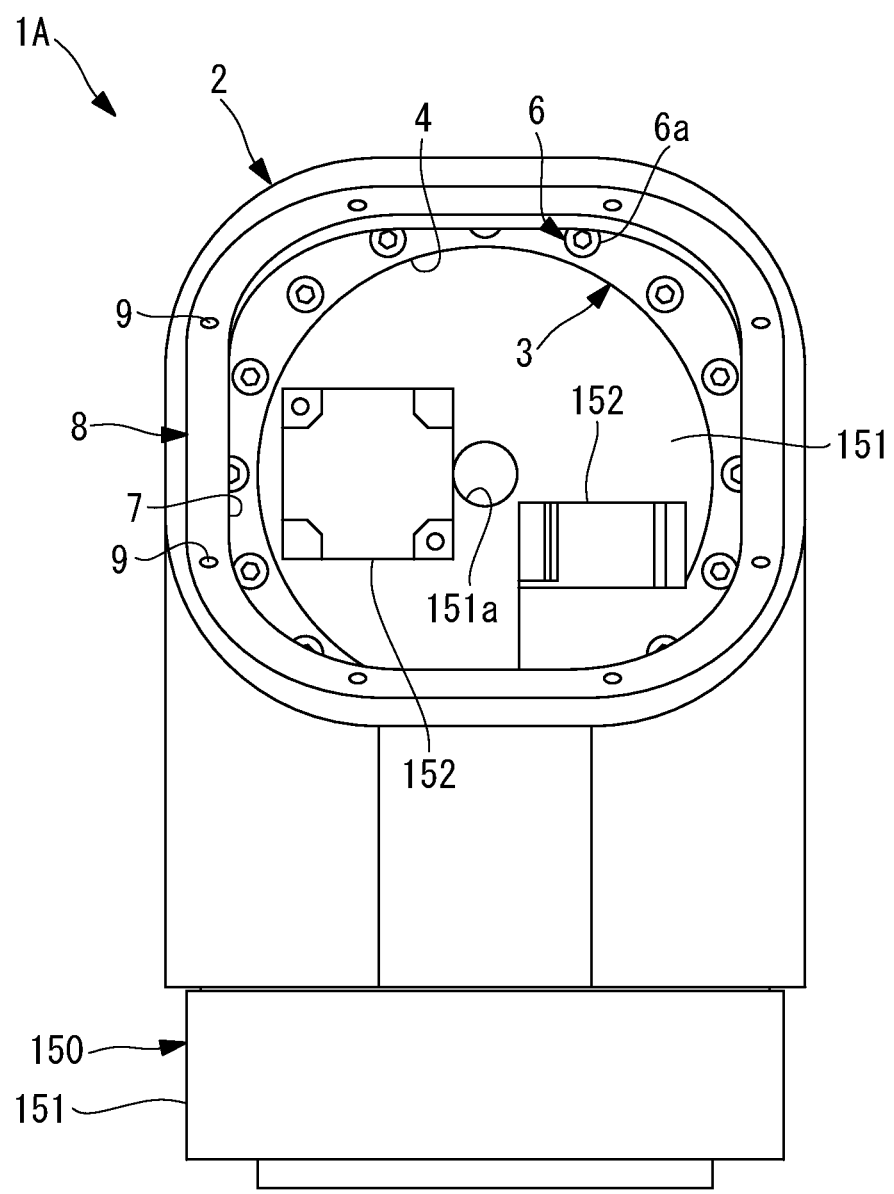
FIG. 9 is a rear view of the robot casing assembled with the reduction gears in FIG. 8.
Figure 10:
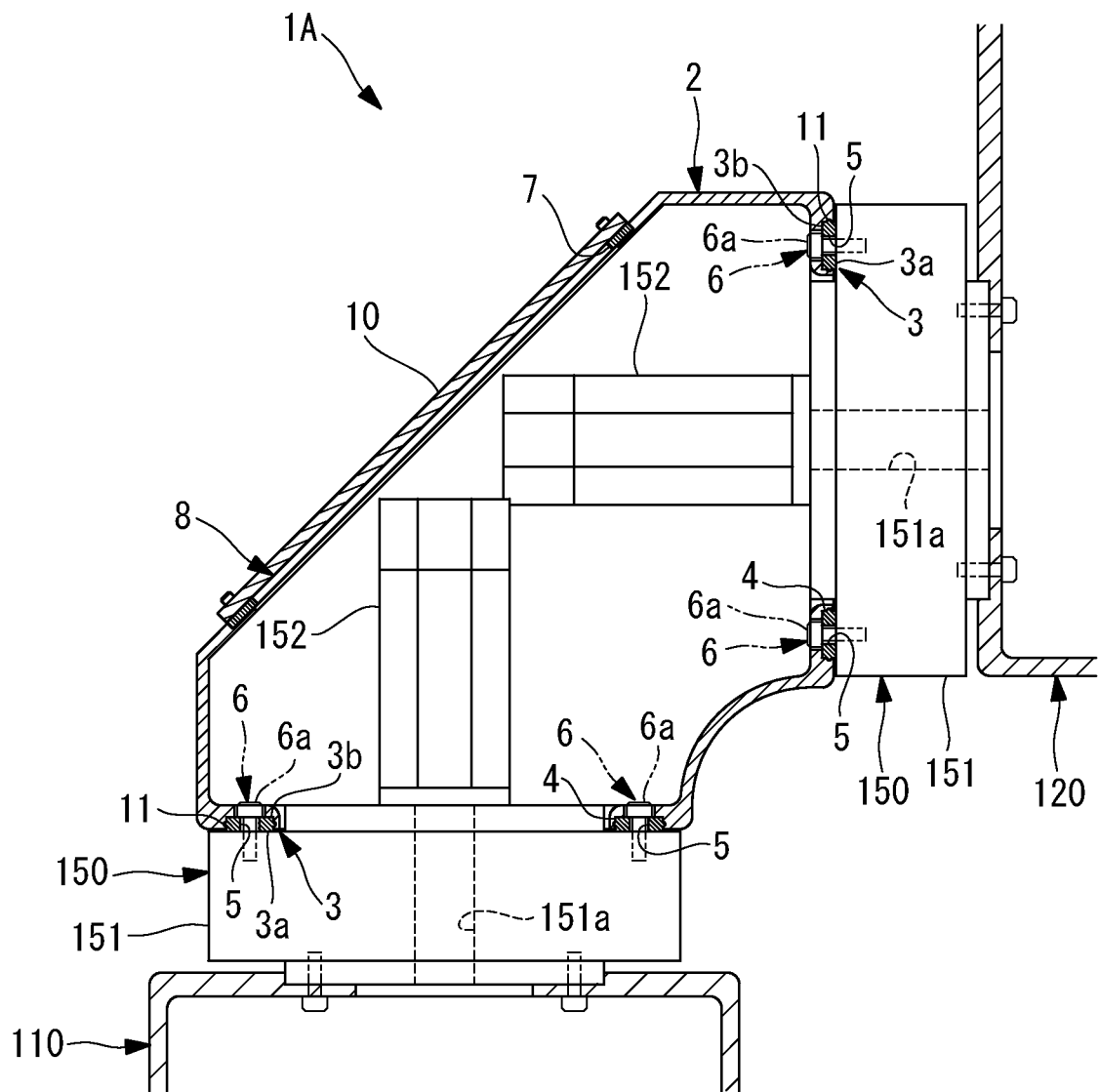
FIG. 10 is a longitudinal sectional view showing a state in which the robot casing in FIG. 2 is assembled with the first-axis reduction gear and the second-axis reduction gear.

In an example shown in FIGS. 8 to 10, the motor 152 that inputs a driving force to the first-axis reduction gear 151 is disposed in the body portion 2 and is fixed to the input shaft of the first-axis reduction gear 151. In addition, the motor 152 that inputs a driving force to the second-axis reduction gear 151 is also disposed in the body portion 2 and is fixed to the input shaft of the second-axis reduction gear 151.

By doing so, a first shaft that rotates the first casing 1A about the vertical first axis A with respect to the base 110 and a second shaft that rotates the first arm 120 about the horizontal second axis B with respect to the first casing 1A are configured.

In addition, in the example shown in FIGS. 8 to 10, each of the reduction gears 151 is provided with a central hole 151a that penetrates therethrough along a central axis thereof. In addition, the motor 152 is eccentrically disposed at a position that does not overlap with the central hole 151a. By doing so, it is possible to perform wiring of a wire body including a power cable for the motor 152 from the base 110 side into the internal space of the first casing 1A and the first arm 120 through the central holes 151a of the reduction gears 151.

By assembling the second to fourth casings 1B, 1C, 1D in a similar manner, it is possible to easily configure the robot 100 shown in FIG. 1.

Although the reduction gear 151 and the motor 152 are directly joined with each other in the structure shown in FIG. 8, an attachment interface for the motor 152 may be provided on the body portion 2. This metal plate for motor attachment may be embedded into the resin of the body portion 2.

As described above, with the casing 1A, 1B, 1C, 1D according to this embodiment, substantially the entire casing is composed of the resin; thus, it is possible to achieve a significant weight reduction, as compared with the case in which the casing is composed of a metal, such as an aluminum alloy.

In addition, because the precisely configured metal plates 3 are manufactured by means of insert molding, the attachment surfaces 3a of the two metal plates 3 can be precisely arranged without machining. By doing so, the need for machining is eliminated, and it is possible to reduce the manufacturing cost.

In particular, because the attachment surface 3a of the metal plate 3 is protruded from the resin constituting the body portion 2, there is an advantage in that the resin does not become a hindrance when attachment to the reduction gear 151 is performed.

In addition, in this case, by making the attachment screw 6 penetrate through the through-hole 5 provided in the metal plate 3 and fastening the attachment screw 6 into the screw hole of the reduction gear 151, the head portion 6a of the attachment screw 6 can be pressed against the seating surface which is the surface 3b of the metal plate 3 on the side opposite to the attachment surface 3a.

In other words, in the case in which the resin is present between the head portion 6a of the attachment screw 6 and the reduction gear 151, a phenomenon in which the bolt is not completely tightened even with repetitive tightening occurs, and a sufficient axial force cannot be imparted; thus, there is a risk that the attachment screw 6 may be loosened with repeated operation of the robot 100. On the contrary, in this embodiment, only the metal plate 3 is disposed between the head portion 6a of the attachment screw 6 and the reduction gear 151; thus, there is an advantage in that it is possible to fasten the attachment screw 6 with a sufficient fastening force, and to reliably prevent loosening of the attachment screw 6.

However, sufficient care should be taken so that the metal plate 3 itself does not peel off from the resin member of the body portion 2 due to a load. Taking this into consideration, as shown in FIG. 7, it is preferable to have a structure in which protrusions 11 protruding in radial directions are provided, on side surfaces of the metal plate 3, at positions spaced apart from the attachment surface 3a in the thickness direction.

By doing so, the metal plate 3 is configured to have a cross-sectional shape with irregularities in the longitudinal direction; thus, the protrusions 11 get caught in the body portion 2, and it is possible to prevent the metal plate 3 from peeling off unless the resin member of the body portion 2 is broken. Although the structure in which the protrusions 11 are provided on the metal plate 3 has been illustrated as an example in this embodiment, alternatively, recessed portions recessed in radial directions may be provided, on the side surfaces of the metal plate 3, at intermediate positions in the thickness direction.

In addition, with the casing 1A, 1B, 1C, 1D according to this embodiment, the work opening 7 is disposed at a central position between the two attachment openings 4, and it is possible to easily perform work for attaching the reduction gears 151 or the like, wiring work for a wire body, and so forth with respect to both the attachment openings 4 through the work opening 7. By using the common work opening 7, it is possible to reduce the number of openings and to enhance the strength of the casing 1A, 1B, 1C, 1D.

Note that, in this embodiment, the body portion 2 having a square tubular shape curved in an L-shape has been illustrated as an example. Alternatively, it is permissible to employ a body portion 2 that is formed in a tubular shape having any other cross-sectional shape, such as a cylindrical shape. In addition, a straight tubular body portion 2 may be employed instead of the body portion 2 having a tubular shape curved in an L-shape.

Figure 11:
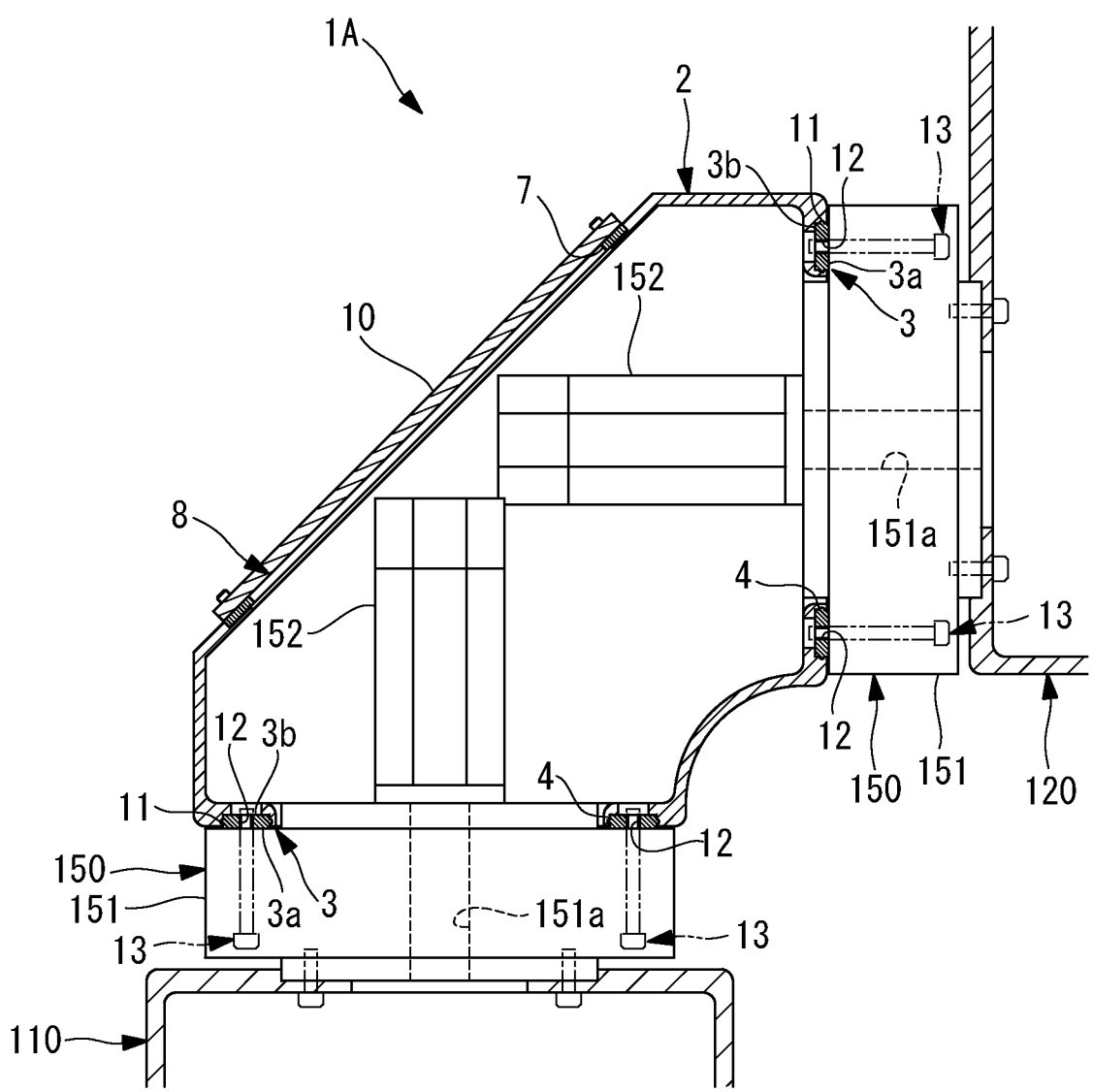
FIG. 11 is a longitudinal sectional view showing a modification of the robot casing in FIG. 2.

In addition, in this embodiment, the metal plate 3 at each of the attachment openings 4 is provided with the through-holes 5 that allow the attachment screws 6 to penetrate therethrough. Alternatively, as shown in FIG. 11, in the case in which through-holes are provided in a component, such as the reduction gear 151, to be attached to the attachment surface, the metal plate 3 may be provided with screw holes 12 into which attachment screws 13 are fastened. In this case, the seating surface need not be exposed on the surface 3b of the metal plate 3 on the side opposite to the attachment surface 3a.

Figure 12:
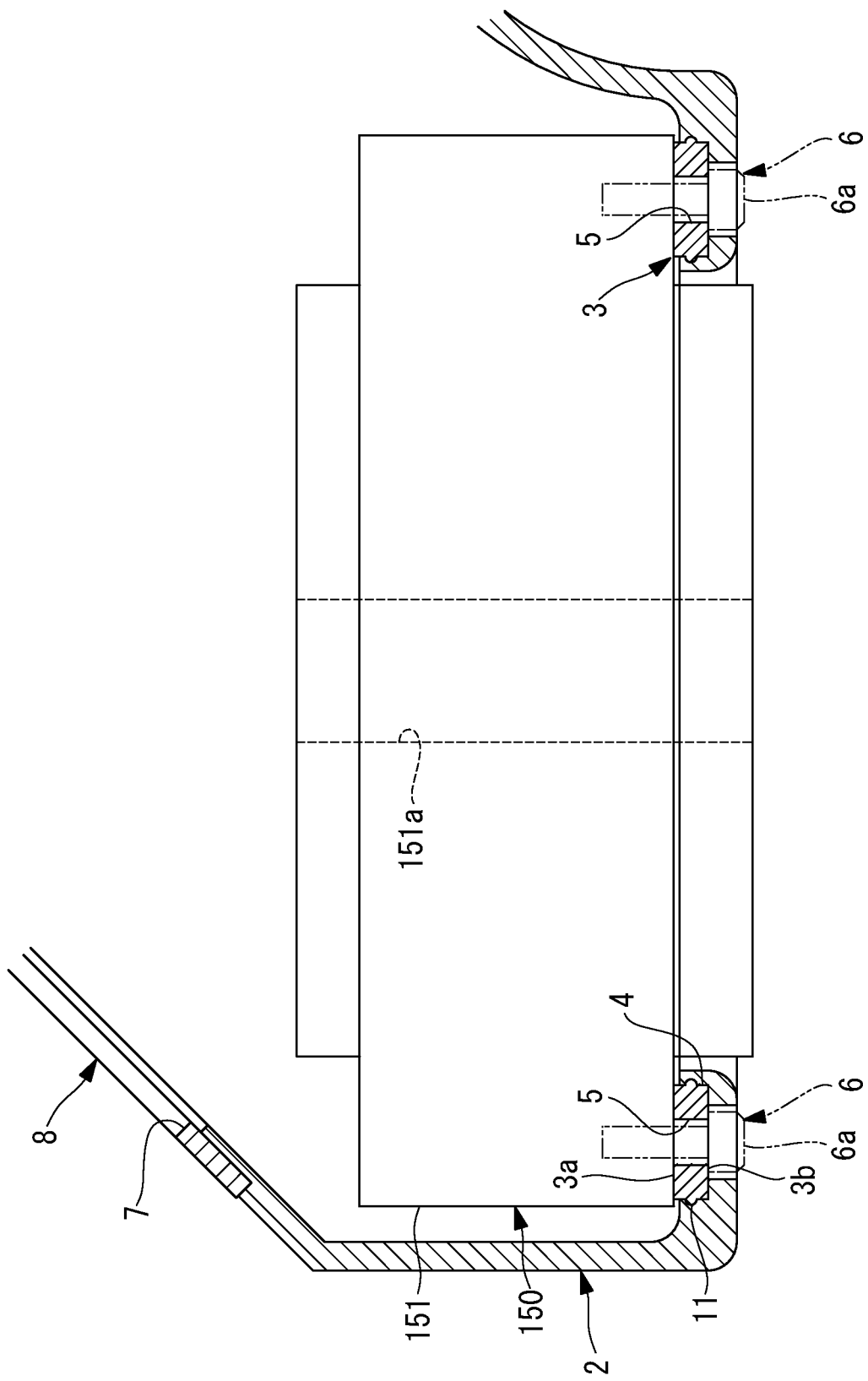
FIG. 12 is a longitudinal sectional view showing another modification of the robot casing in FIG. 2.

In addition, in this embodiment, the attachment surface 3a of the metal plate 3 at each of the attachment openings 4 is disposed on the outer side of the body portion 2. Alternatively, as shown in FIG. 12, in the case in which a component such as the reduction gear 151 is disposed in the body portion 2, the attachment surface 3a may be provided so as to be exposed on an inner side of the body portion 2.

Although the metal plate 3 is provided in the form of an inner flange extending radially inward from a side wall of the body portion 2 in this embodiment, alternatively, the metal plate 3 may be provided in the form of an outer flange extending radially outward from the side wall of the body portion 2.

Figure 13:
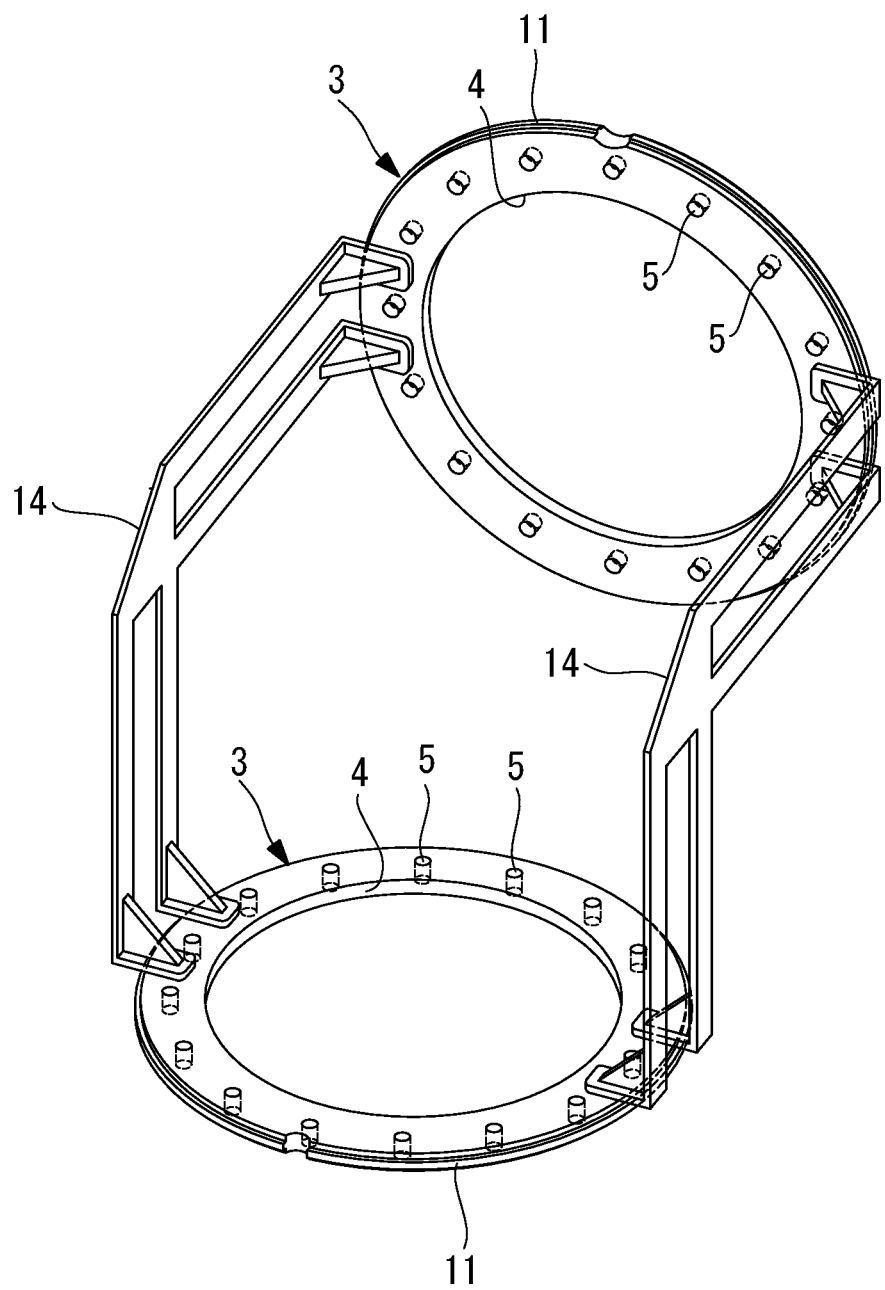
FIG. 13 is a perspective view showing, together with the metal plates, an example of reinforcing metal members provided in a modification of the robot casing in FIG. 2.

In addition, as shown in FIG. 13, a reinforcing metal member 14 that connects the metal plates 3 at the two attachment openings 4 may be embedded in the resin constituting the body portion 2. The reinforcing metal member 14 has a shape conforming to a side wall of the body portion 2, and may be joined with the metal plates 3 by means of bolts, welding or the like, or may be formed integrally with the metal plates 3.

By providing the reinforcing metal member 14, it is possible to enhance the rigidity of the casing 1A, 1B, 1C, 1D, and to reduce the stress when a load acts on the casing 1A, 1B, 1C, 1D. A plurality of the reinforcing metal members 14 may be provided, and ribs may be provided on each of the reinforcing metal members 14. The reinforcing metal member 14 may be entirely or partially embedded, together with the metal plates 3, in the resin constituting the body portion 2 by means of insert molding. For example, portions of the ribs may be exposed from the resin.

Figure 14:
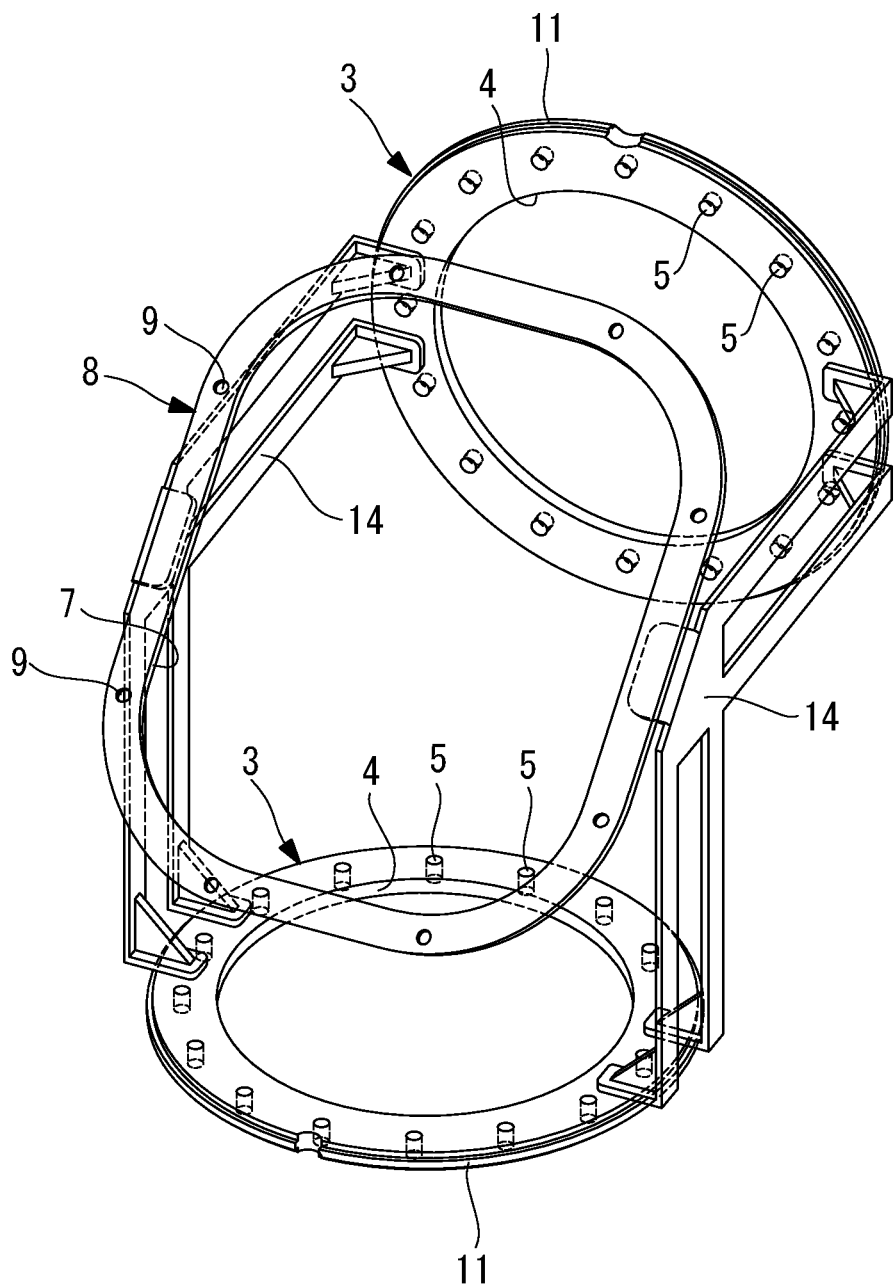
FIG. 14 is a perspective view showing, together with the metal plates, an example of other reinforcing metal members provided in a modification of the robot casing in FIG. 2.
Figure 15:
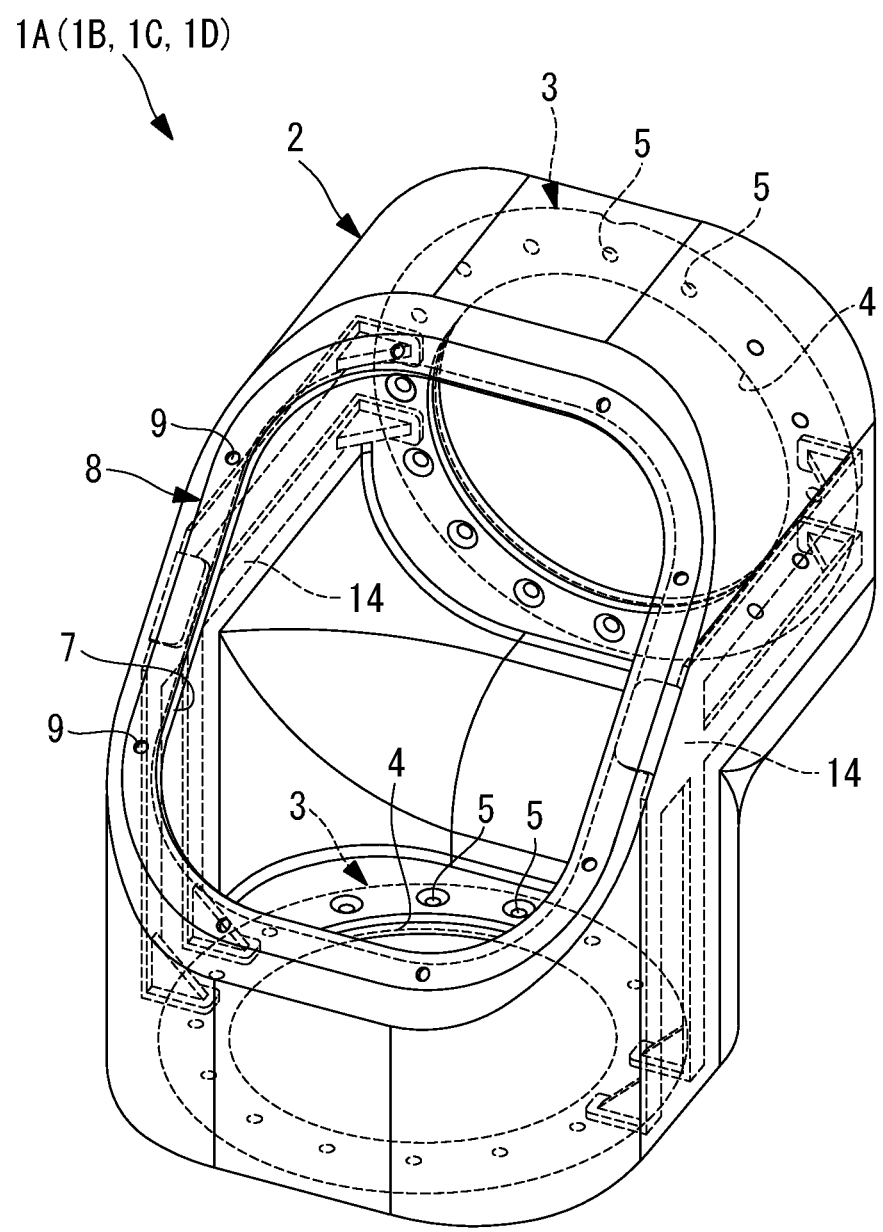
FIG. 15 is a perspective view showing a modification of the robot casing in FIG. 2, in which the reinforcing metal members in FIG. 13 are embedded.

In addition, as shown in FIG. 14, in the case in which the metal plate 8 is disposed at the work opening 7, the reinforcing metal members 14 may connect the metal plates 3 at the two attachment openings 4 and the metal plate 8 at the work opening 7. By doing so, it is possible to further enhance the rigidity of the casing 1A, 1B, 1C, 1D. In addition, as shown in FIG. 15, by arranging the reinforcing metal members in the resin constituting the body portion 2, it is possible to reduce warping of the resin after molding.

Although the metal plate 3, which is a ring plate-like member provided with the central hole 4 constituting the attachment opening 4 and the plurality of through-holes 5 at the periphery of the central hole 4, has been illustrated as an example of the metal member in this embodiment, alternatively, a plurality of washer-like metal members each having a single through-hole 5 may be disposed at the periphery of the central hole 4 and may be embedded into the resin constituting the body portion 2. Similar to the metal plate 3, this washer-like metal member may have a shape with irregularities. The same structure may be applied to the metal plate 8.

Although it has been described that the entire body portion 2 is composed of the resin in this embodiment, alternatively, it is permissible to employ a body portion in which a surface of a thin-walled member made of a metal, such as aluminum, is covered with a resin. By using a metal in combination, it is possible to increase the rigidity of the body portion 2, and it is also possible to reduce the amount of the metal used by using the metal and the resin in combination, thereby achieving a weight reduction. In addition, by forming the outer surface of a resin, it is possible to configure the casing 1A, 1B, 1C, 1D having a relatively soft surface.

In addition, the robot casing 1A, 1B, 1C, 1D according to this embodiment may be integrally molded by using an injection molding method.

In addition, a lid body 10 having a snap-fit structure may be employed in this embodiment. In this case, the snap-fit structure of the lid body 10 is attached to the body portion 2 so as to be able to open and close the work opening 7, whereby the body portion 2 can be closed as a result of the snap-fit structure being engaged with the work opening 7.

In addition, the resin constituting the body portion 2 is preferably a resin having a flame retention time of 10 seconds or less even when the resin is placed in the vertical direction and subjected to the flame for 10 seconds, and also having flame retardancy such that the resin does not burn more than 127 mm. Furthermore, when a test piece $((125\pm5)\times(13\pm0.5)\times t)$ mm is directly attached to a clamp, and 10-second contact with a 20 mm flame is performed twice, it is preferable that: the burning time of each test piece be 10 seconds or less; the total burning time of five test pieces be 50 seconds or less; the burning and glowing time of each test piece be 30 seconds or less; the burning not reach the clamp; and cotton disposed below the test piece not be ignited. With this configuration, there is an advantage in that self-extinguishing properties can be secured even if the casing 1A, 1B, 1C, 1D is overheated due to some causes. In addition, even if the flame retardancy does not satisfy the conditions described above and the level thereof is somewhat lower, it is needless to say that the resin satisfactorily functions as the casing 1A, 1B, 1C, 1D.

In addition, besides the case of using a flame-retardant resin as described above, even if the resin itself has low flame retardancy, a coating having higher flame retardancy than the resin may be applied onto the entire outer surface of the resin.

In addition, any thermosetting or thermoplastic resin may be employed as the resin.

In addition, any fiber-reinforced resin, such as a glass fiber-reinforced resin or a carbon fiber-reinforced resin, may be employed as the resin. In a glass fiber-reinforced resin, because fibers are colorless and transparent, it is also possible to reduce the coating cost by kneading a color into a base material. In a carbon fiber-reinforced resin, because carbon fibers are black, the black color of the fibers is visible even if a color is kneaded into the base material; thus, it is preferable to apply the aforementioned coating having high flame retardancy onto the outer surface of the resin.

In addition, in this embodiment, a cross section parallel to the attachment surface 3a of the metal plate 3, which is disposed at two locations of the body portion 2, has a square contour shape with corner portions thereof being rounded; however, the cross-sectional contour shape is not limited thereto, and the cross-sectional contour may be formed in a circular shape. The circular shape allows a corner R to be larger, and the effect of mitigating a contact force at the time of contact with a person can be expected.

Figure 16:
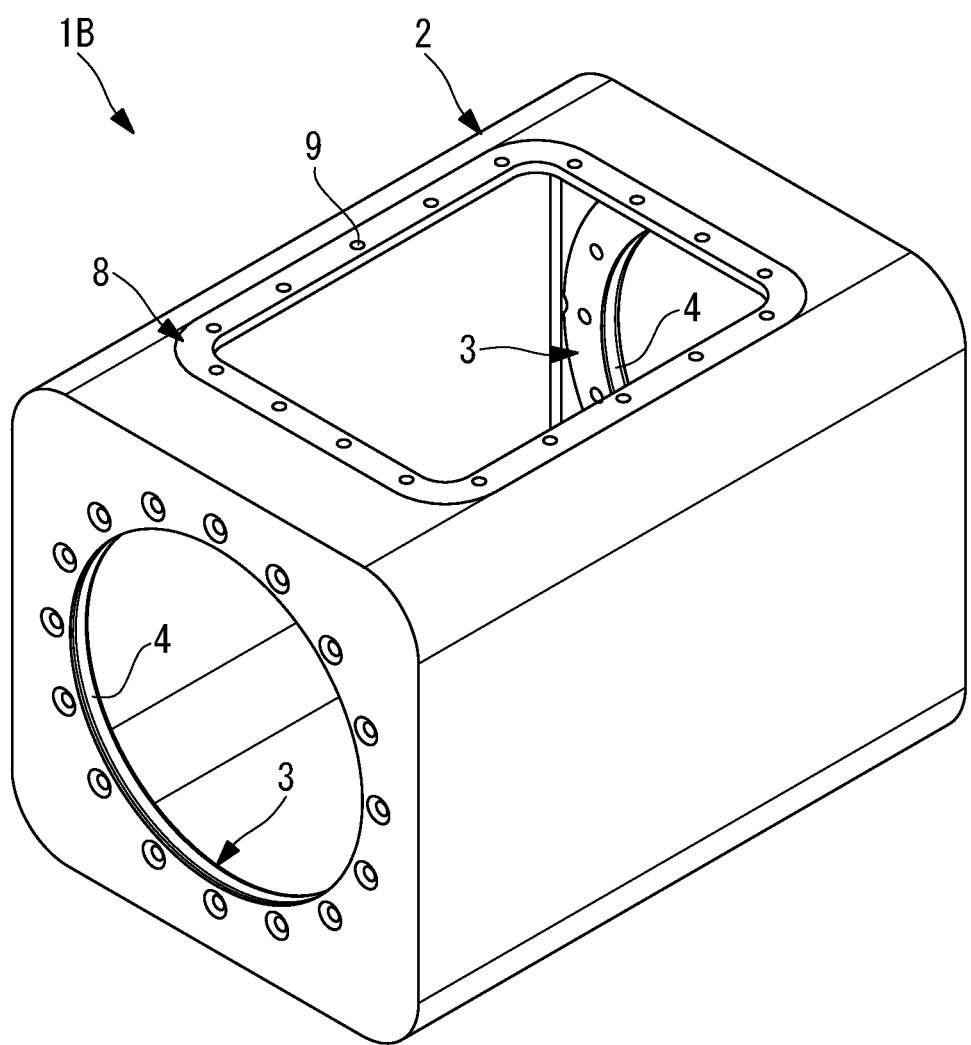
FIG. 16 shows a modification of a second robot casing in FIG. 1.

In addition, a modification of the second casing 1B, as shown in FIG. 16, may be employed in this embodiment. In this case, as shown in FIG. 17, the second casing 1B is different from the second casing 1B in FIG. 6 in that the two metal plates 3 are arranged so that the attachment surfaces 3a are parallel to each other. In addition, the work opening 7 is provided on a surface of the resin body portion 2, said surface being located in a space between the two metal plates 3. The attachment surfaces 3a of the two metal plates 3 are exposed to the inside of the body portion 2.

In the example in FIG. 16, there is also a case in which one of the attachment surfaces 3a of the two metal plates 3 serves as an attachment surface for an actuator 150 that rotates the second arm 130, and the other serves as an attachment surface to which the first arm 120 is directly attached. In this case, the attachment surface to which the first arm 120 is directly attached is preferably exposed to the outside.

With this configuration, the reduction gear 151 or the like is accommodated in the body portion 2 through the work opening 7, and is fixed from the outside of the body portion 2 by means of bolts, with the surface 3b serving as the seating surface, in a state in which the reduction gear 151 or the like is in contact with the attachment surface 3a of the one metal plate 3. A link member or the like is attached to the attachment surface 3a of the other metal plate 3. In addition, the reinforcing metal members 14 that mutually connect the metal plates 3 and the metal plate 8 may be embedded in the resin constituting the body portion 2.

The invention claimed is:

1. A robot casing comprising, in a hollow resin body portion, two attachment openings and a single work opening that communicate between an inside and an outside of the body portion, wherein:
    the two attachment openings are respectively provided in both end portions of the body portion;
    a metal member constituting an attachment surface is embedded in a resin constituting the body portion at a periphery of the attachment opening;
    the metal member is provided with attachment holes that allow attachment screws, which are used for attachment to the attachment surface, to penetrate therethrough or to be fastened thereinto, and is also embedded in the resin in a state in which the attachment surface is exposed; and
    components can be respectively attached to the two attachment openings by utilizing the single work opening as a common work opening therefor.

2. The robot casing according to claim 1, wherein the work opening is formed at a position and has a size such that the components can be made to pass therethrough, the components being respectively attached to the two attachment openings through an interior of the body portion from an outside of the work opening.

3. The robot casing according to claim 1, wherein:
the metal member comprises a flat plate-like member; and
the attachment holes comprise a plurality of through-holes that penetrate through the metal member in a plate thickness direction.

4. The robot casing according to claim 1, wherein the metal member is embedded in the resin in a state in which a seating surface is exposed at a periphery of the attachment hole on a side opposite to the attachment surface.

5. The robot casing according to claim 4, wherein:
the metal member comprises a flat plate-like member; and
the attachment holes comprise a plurality of screw holes that penetrate through the metal member in a plate thickness direction.

6. The robot casing according to claim 1, wherein the work opening is disposed at a center between the two attachment openings.

7. The robot casing according to claim 1, wherein the attachment surfaces of the two attachment openings are arranged in a mutually orthogonal positional relationship.

8. The robot casing according to claim 7, wherein:
the body portion is formed in a tubular shape curved in an L-shape;
the attachment openings are arranged at both ends of the body portion; and
the work opening is disposed in a curved portion of the body portion.

9. The robot casing according to claim 6, further comprising a lid body that is attached to the body portion so as to be able to open and close the work opening, wherein:
another metal member is embedded in the resin constituting the body portion at the periphery of the work opening; and
the other metal member is provided with screw holes into which screws for attaching the lid body to the work opening are fastened.

10. The robot casing according to claim 6, further comprising a lid body having a snap-fit structure that is attached to the body portion so as to be able to open and close the work opening,
wherein the body portion is closed by engagement of the snap-fit structure of the lid body.

11. The robot casing according to claim 1, further comprising a reinforcing metal member that connects the two metal members provided at the two attachment openings.

12. The robot casing according to claim 9, further comprising a reinforcing metal member that connects the two metal members provided at the two attachment openings and the other metal member.

13. The robot casing according to claim 1, wherein the metal member is embedded in the resin constituting the body portion by means of insert molding.

14. The robot casing according to claim 11, wherein the metal member and the reinforcing metal member are embedded in the resin constituting the body portion by means of insert molding.

15. The robot casing according to claim 12, wherein the metal member and the reinforcing metal member are embedded in the resin constituting the body portion by means of insert molding.

16. The robot casing according to claim 1, wherein the robot casing is integrally molded by using an injection molding method.

17. The robot casing according to claim 1, wherein the resin constituting the body portion has a flame retention time of 10 seconds or less even when the resin is placed in a vertical direction and subjected to a flame for 10 seconds, and also has flame retardancy such that the resin does not burn more than 127 mm.

18. The robot casing according to claim 1, wherein an outer surface of the resin constituting the body portion is covered with a coating having a flame retention time of 10 seconds or less even when placed in a vertical direction and subjected to a flame for 10 seconds, and also having flame retardancy such that the coating does not burn more than 127 mm.

19. A robot comprising at least one robot casing comprising, in a hollow resin body portion, two attachment openings and a single work opening that communicate between an inside and an outside of the body portion, wherein:
the two attachment openings are respectively provided in both end portions of the body portion;
a metal member constituting an attachment surface is embedded in a resin constituting the body portion at a periphery of the attachment opening;
the metal member is provided with attachment holes that allow attachment screws, which are used for attachment to the attachment surface, to penetrate therethrough or to be fastened thereinto, and is also embedded in the resin in a state in which the attachment surface is exposed; and
components can be respectively attached to the two attachment openings by utilizing the single work opening as a common work opening therefor.

* * * * *